United States Patent [19]
Hazenbroek

[11] 3,979,793
[45] Sept. 14, 1976

[54] POULTRY EVISCERATING APPARATUS

[75] Inventor: Jacobus E. Hazenbroek, Numansdorp, Netherlands

[73] Assignee: Barker International, Inc., Marietta, Ga.

[22] Filed: Apr. 12, 1974

[21] Appl. No.: 460,282

[52] U.S. Cl. .................................................. 17/11
[51] Int. Cl.² ......................................... A22C 21/06
[58] Field of Search ................... 17/11, 11.3; 198/24

[56] References Cited
UNITED STATES PATENTS

| | | | |
|---|---|---|---|
| 3,653,093 | 11/1970 | Scheier | 17/11 |
| 3,750,231 | 8/1973 | Schrevder | 17/11 |
| 3,806,988 | 4/1974 | Harben, Jr. | 17/11 |
| 3,879,803 | 4/1975 | Verbakel | 17/11 |

*Primary Examiner*—Robert Peshock
*Attorney, Agent, or Firm*—Price, Heneveld, Huizenga & Cooper

[57] ABSTRACT

Apparatus for eviscerating a continuous succession of birds, fowl, poultry, or the like and adapted to form a part of a fowl processing line. The apparatus includes a plurality of viscera removing members each being pivotally mounted with respect to two pivot axes for movement through a path to remove the viscera of a single, pre-positioned fowl. The viscera removal members and pivoting means therefor extend radially outwardly from a central shaft over a cylindrical housing. Means are included for clamping each bird against the housing in position for removal of its viscera through a previously made cut in its vent. The viscera removal apparatus and housing are rotated in synchronism with an overhead conveyor from which the fowl are individually suspended. The removal apparatus may be disengaged from the conveyor for repair or adjustment while the conveyor continues to operate whereby complete shut-down of the fowl processing line is avoided.

35 Claims, 13 Drawing Figures

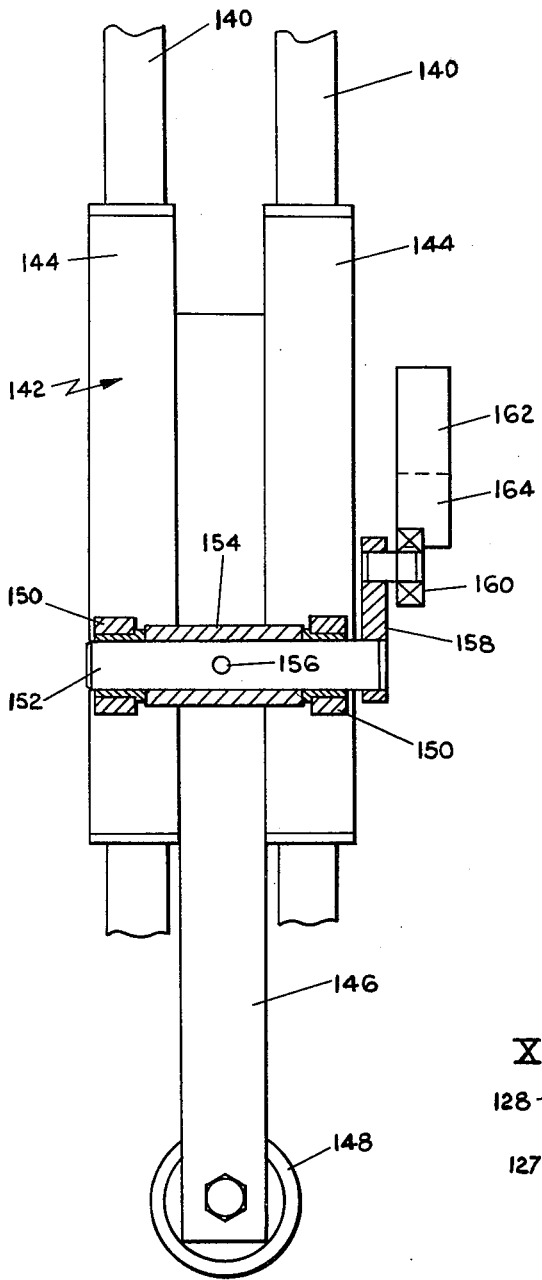
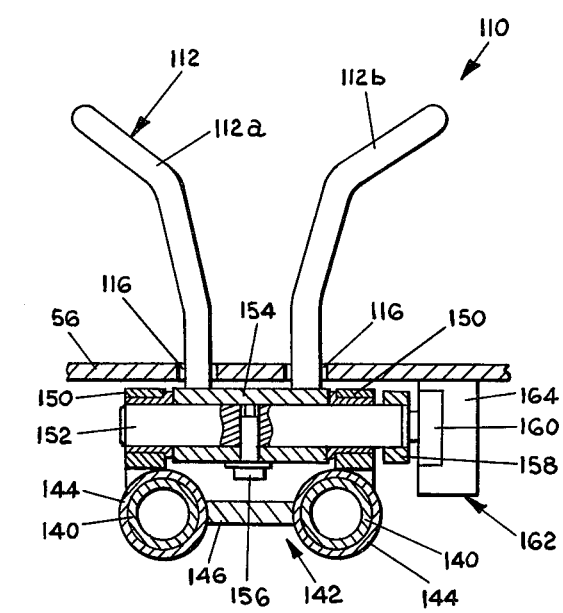
FIG.8
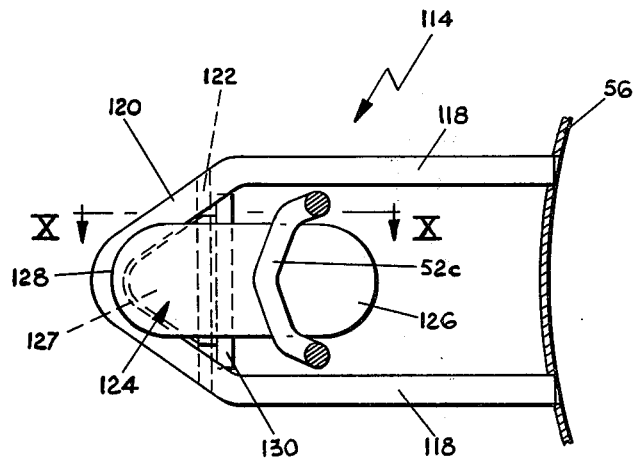
FIG.7  FIG.9

POULTRY EVISCERATING APPARATUS

BACKGROUND OF THE INVENTION

This invention relates to machinery for the removal of viscera from poultry such as chickens or the like, and more particularly, to a poultry eviscerating apparatus which automatically eviscerates a continuous succession of birds without human intervention.

Many and varied types of poultry eviscerating apparatus are known. Some comprise devices in which a single bird or fowl is manually mounted in a predetermined position after which a specially designed tool analogous to a spoon is caused to enter the abdominal cavity of the bird for removal of the viscera. Such manual machines are both time consuming and expensive to operate since each requires at least one human operator as well as attendant facilities to provide him with uneviscerated birds and remove those that have been eviscerated.

Other eviscerating apparatus has been devised to eviscerate birds or fowl traveling on a continuous conveyor. Such machines have tended to be rather complex devices and/or have required hand loading of the birds. Such machinery as has contemplated automatic loading has tended to be unreliable, suffering many breakdowns during use. Such breakdowns comprise a significant expense to poultry processors.

A particularly disadvantageous aspect of the prior known eviscerating apparatuses for processing a continuous succession of birds or fowl is the fact that these machines cause a shut-down in the entire poultry processing line during the above-mentioned breakdowns. Typically, eviscerating machinery forms but a part of several processing elements spaced along a continuous conveyor in a processing plant. Removal of the viscera from the fowl precedes the washing, sorting, and inspection of the various useable parts thereof. Evisceration also precedes the final processing of the remainder of the fowl carcass. Since the prior known machines have been integral parts of such processing lines, and the conveyors have passed continuously around or through the eviscerating apparatus, a breakdown of the eviscerating machine necessitates a corresponding stoppage of the main processing conveyor thereby shutting down all of the above-mentioned operations. Breakdowns with the prior known machines, therefore, have proven to be extremely costly.

The present invention provides a poultry eviscerating apparatus which is capable of eviscerating a continuous succession of birds or fowl without human intervention and which is extremely reliable in its operation. If breakdown or malfunction should occur, however, the apparatus includes means to disconnect it from the conveyor or line, permitting the line to continue running and the manual evisceration of the birds or fowl while the eviscerating apparatus is repaired.

SUMMARY OF THE INVENTION

Accordingly, it is the purpose of the present invention to provide a poultry eviscerating apparatus for removing the viscera of a continuous succession of birds or fowl suspended from a continuous conveyor which carries the birds through the eviscerating operation as well as other processing operations. A principal feature of the invention is its reliability, the viscera removal members being individually and positively cammed and pivoted in an arcuate path into the abdominal cavity of a bird or fowl carcass with only a minimal number of moving parts. A related feature of the invention is its versatility in handling various sizes of poultry by making a small number of adjustments to the machine.

In the preferred embodiment, the eviscerating apparatus comprises a conveyor means for conveying at least one bird or fowl through a predetermined path, the fowl having a cut previously made in its vent. Means are included for holding the fowl in a predetermined position during such conveyance. A viscera removal member is included along with means for supporting and moving the removal member through the previously made cut in the fowl for removing the viscera therefrom during the conveyance of the fowl. The supporting and moving means include means for pivoting the viscera removal member with respect to at least two pivot axes whereby the removal member is caused to follow an arcuate path around the body cavity of the fowl to remove the viscera through the abdominal cut.

In related aspects of the invention, the apparatus includes means for engaging and disengaging the viscera removal means from the conveyor means. Such apparatus allows the processing conveyor in the poultry processing plant to continue its travel while the birds or fowl are moved in their normal paths around the stopped eviscerating apparatus for manual evisceration by a plurality of human operators during the period in which the machine is shut down for repair or adjustment.

These and other objects, advantages, pruposes and features of the invention will become more apparent from a study of the following description taken in conjunction with the drawings.

BRIEF DESCRIPTION OF THE DRAWINGS

FIG. 7 is a fragmentary, partially sectional view of the camming apparatus for the fowl positioning means taken along plane VII—VII of FIG. 6;

FIG. 8 is a fragmentary, sectional view of the fowl positioning apparatus taken along line VIII—VIII of FIG. 6;

FIG. 9 is a plan view of another portion of the fowl positioning apparatus;

DESCRIPTION OF THE PREFERRED EMBODIMENT

Figure 1:
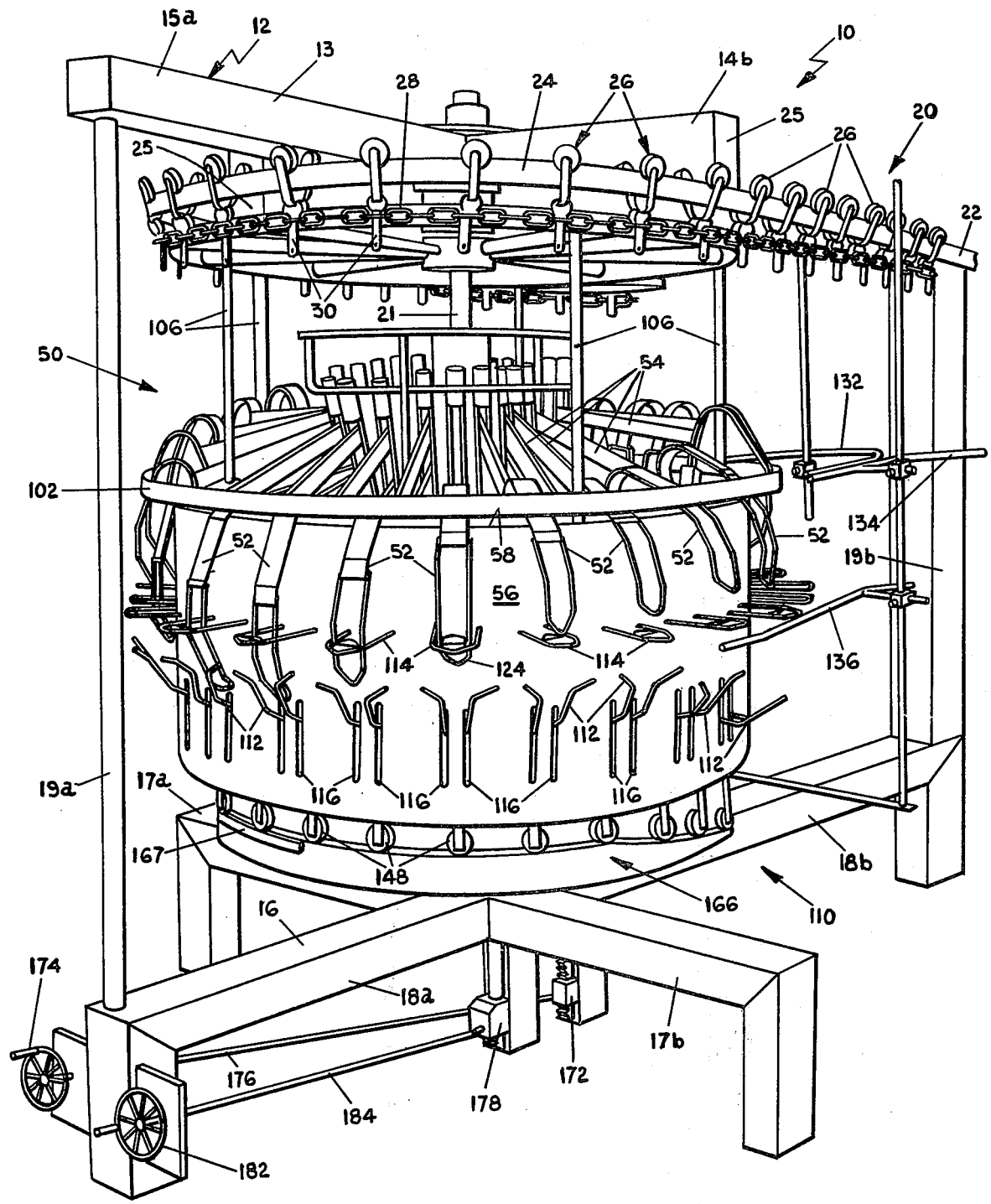
FIG. 1 is a perspective view of the present poultry eviscerating invention taken from the right-hand side of the apparatus.
Figure 2:
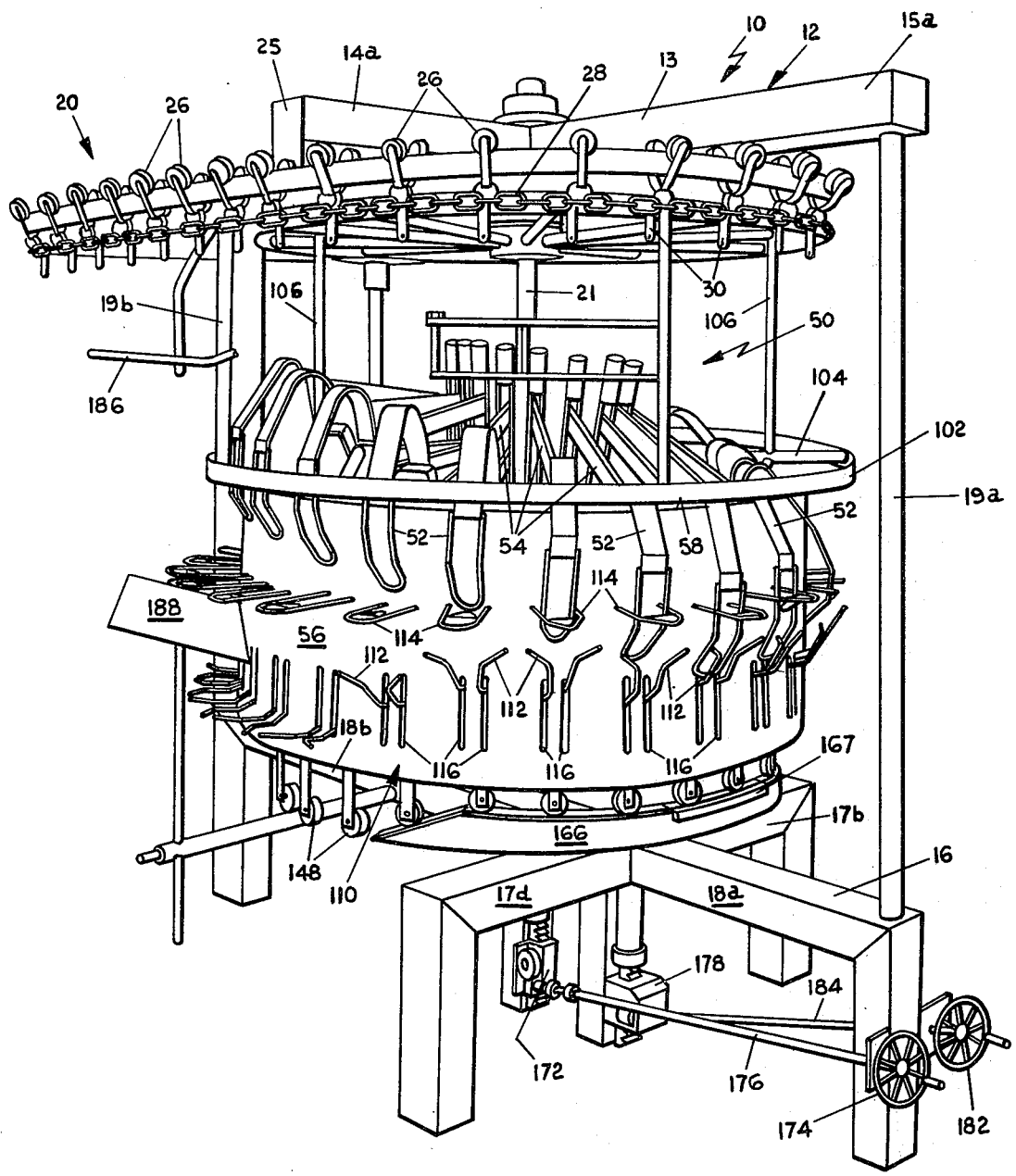
FIG. 2 is a perspective view of the poultry eviscerating apparatus shown in FIG. 1 taken from the left-hand side of the apparatus.
Figure 3:
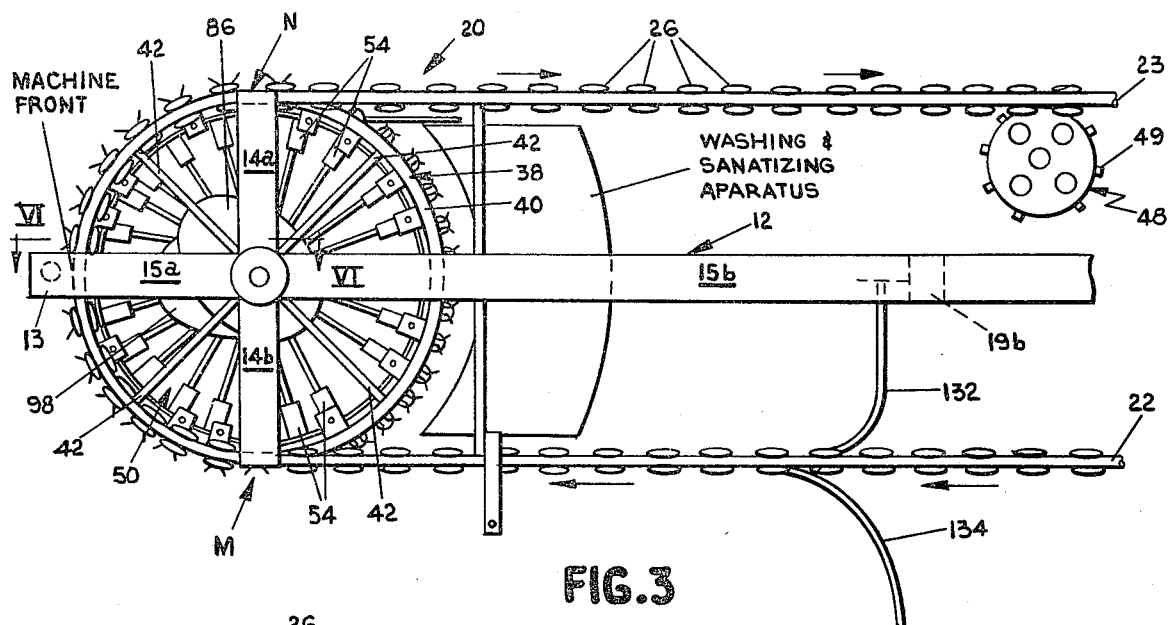
FIG. 3 is a fragmentary, plan view of the poultry eviscerating apparatus of FIGS. 1 and 2 along with the overhead conveyor associated therewith.

Referring now to the drawings in greater detail, FIGS. 1–3 illustrate the preferred form of the present eviscerating apparatus 10. Apparatus 10 typically forms but a part of a larger poultry or fowl processing operation line within a poultry processing plant. The apparatus includes an overhead conveyor 20, shown broken at location 22 (FIGS. 1 and 3), which leads from and to other processing equipment in the eviscerating room. The conveyor continues on from location 23 (FIGS. 2 and 3) to other equipment in the eviscerating system such as giblet processing and washing stations, gizzard skinners, inspection stations, and the like.

The apparatus 10 includes several cooperating portions comprising a supporting framework 12 and overhead conveyor 20, the viscera removal assembly 50 including a plurality of viscera removal members 52 and a plurality of fowl positioning and clamping assemblies 110, and apparatus 172 for disengaging assembly 50 from conveyor 20.

SUPPORTING FRAMEWORK AND CONVEYOR

Framework 12 includes an upper, cross-like frame member 13 including extending arms 14a, 14b, and 15a, 15b. A correspondingly shaped cross-like, base frame member 16 includes corresponding extending arms 17a, 17b and 18a, 18b which are parallel to the arms of member 13. The upper frame member 13 is supported above base member 16 by pole 19a at the front of the machine and column 19a at the rear of the machine. A central, nonrotatable, axially slideable shaft 21 extends vertically between the two vertically aligned areas of frame member 13 and 16 at which cross arms 14, 15, 17, and 18 respectively meet. Both the conveyor 20 and the rotatable, viscera removal assembly 50 including fowl positioning and clamping assemblies 100 are mounted for rotation about shaft 21 generally between and vertically intermediate the upper frame member 13 and base frame member 16.

Figure 4:
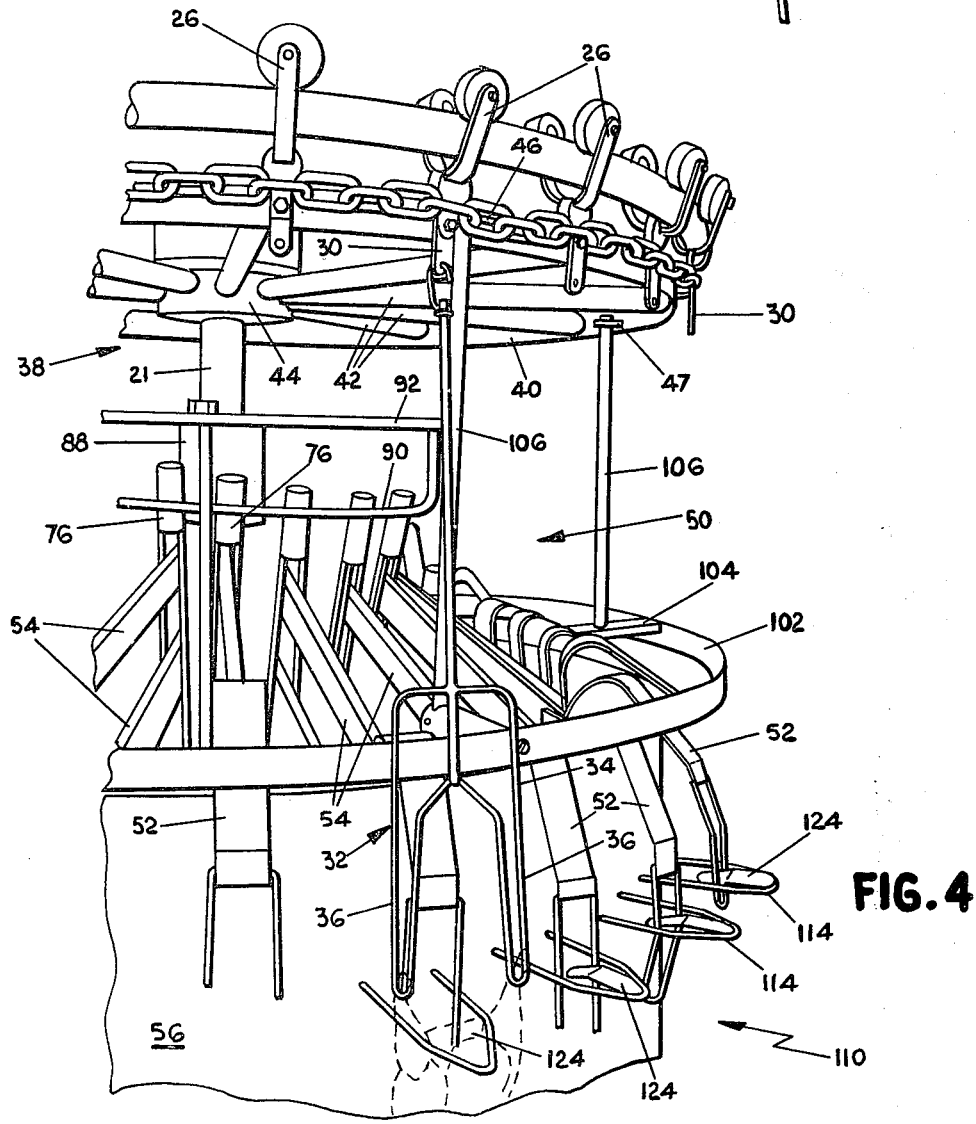
FIG. 4 is a fragmentary, perspective view of a portion of the poultry eviscerator including the overhead conveyor and a portion of the means for suspending and positioning the birds or fowl for evisceration.
Figure 5:
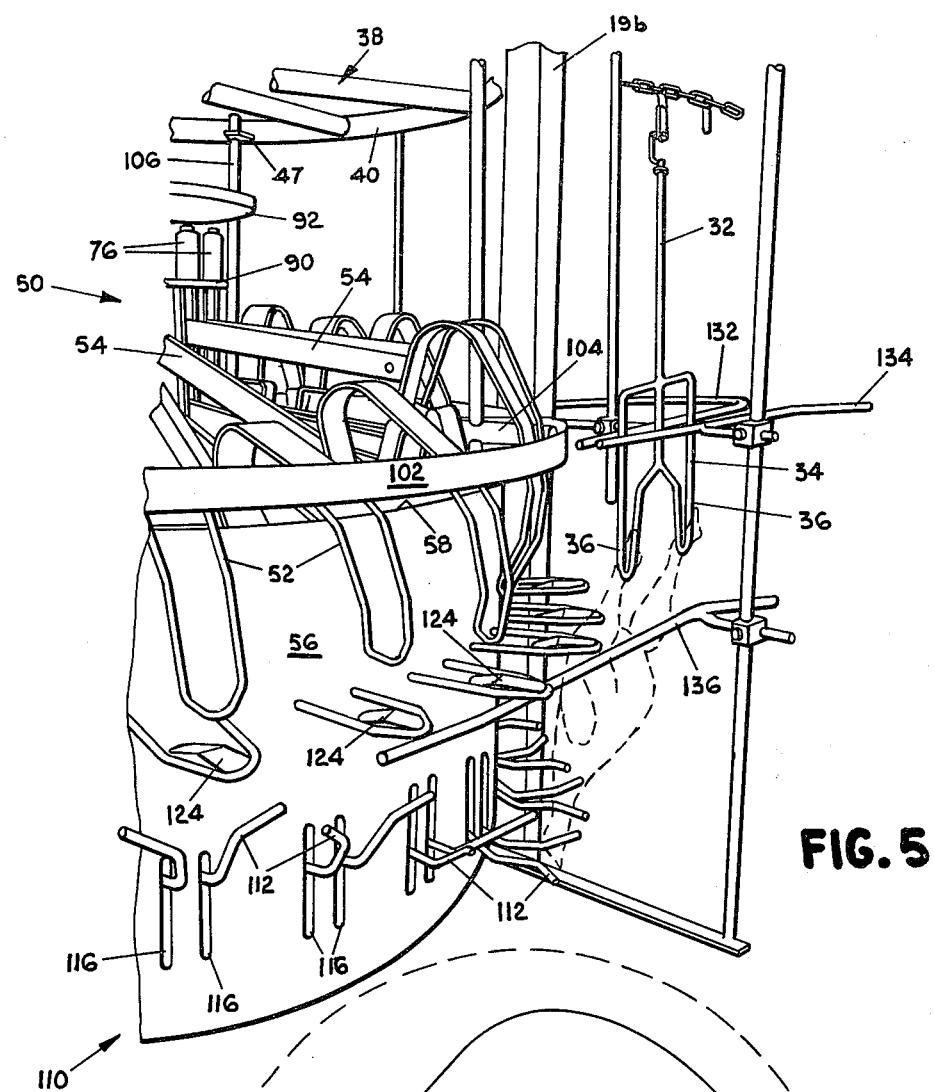
FIG. 5 is a fragmentary, perspective view of another portion of the poultry eviscerating apparatus illustrating the means for guiding successive birds or fowl into the positioning apparatus of the eviscerating machine.
Figure 12:
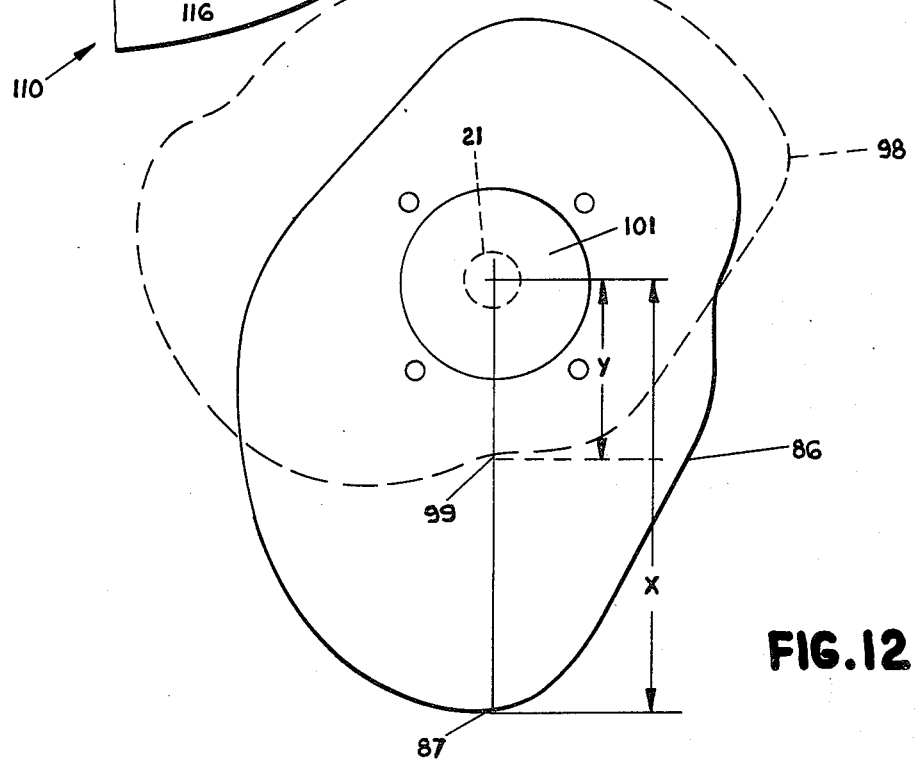
FIG. 12 is a projection of the two camming plates which control the pivotal movement of the viscera removal members in the apparatus.
Figure 6:
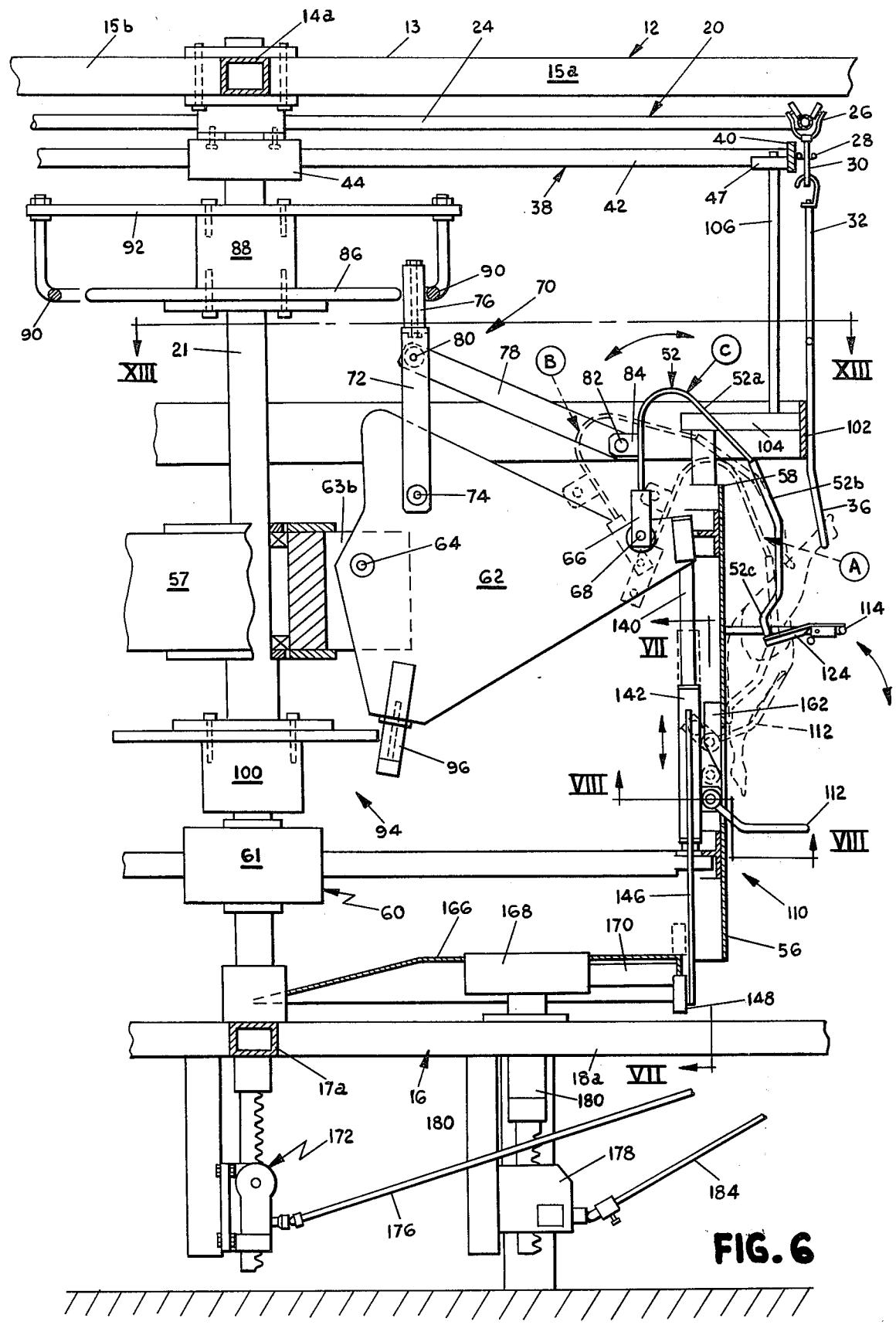
FIG. 6 is a fragmentary, cross-sectional view of the eviscerating apparatus taken along plane VI—VI of FIG. 3.

As seen in FIGS. 1–6, conveyor 20 includes a generally U-shaped support rod 24 which is suspended from plates 25 secured to the ends of cross arms 14a and 14b of frame member 13. Rod 24 and the entire conveyor 20 may have any desired configuration, not necessarily the U-shape, depending on the positions of the various elements in the complete poultry processing line. Rod 24 supports a plurality of generally V-shaped roller brackets 26, each bracket including a pair of wheels inclined at an angle to each other and engaging the upper surfaces of rod 24. Roller brackets 26 are spaced apart equally. Each is secured to one link of conveyor drive chain 28. An apertured securing flange 30 extends downwardly from each of the roller brackets 26 from which is suspended a fowl supporting shackle 32 (FIG. 4). Each shackle 32 includes a generally Y-shaped portion 34 including a pair of downwardly extending, spaced, bent rod loops 36. As is best seen in FIGS. 4, 5, and 6, the individual birds or fowl such as chickens are suspended in an inverted manner with the ends of their drumsticks grasped within bent rod loops 36 of shackle 32. Each bird is cut generally horizontally in the lower portion of its abdomen or vent generally between its legs to form an entryway through which viscera removal member 52 may enter to remove the viscera therefrom.

The conveyor drive chain 28, as well as all of the roller brackets 26 on support rod 24, are guided through a semicircular path at the closed end of the U-shaped rod 24 by a wheel 38 including a generally right, circular, cylindrical wheel rim 40 extending about its periphery at the ends of spokes 42. Wheel 38 includes a central hub 44 including suitable bearing means for rotatably mounting the wheel about the nonrotatable central shaft 21. Shaft 21 can slide axially through hub 44 as will be explained below.

Driving power for movement of the conveyor chain 28 along the semi-circular path is provided with one or more drive sprockets 48 spaced along the length of the conveyor for rotatable engagement therewith via sprocket teeth 49 (FIG. 3). Wheel rim 40 includes extending lugs or teeth 46 (FIG. 4) at spaced points around the circumference of rim 40 for engaging the generally vertically aligned links of chain 28. Extending inwardly from rim 40 at spaced points therearound are five generally horizontal flanges 47, each including a circular aperture for engaging connecting rods 106 extending upwardly from the viscera removal assembly. Thus, motive power is transferred from conveyor drive chain 28 to conveyor guide wheel 38 via studs 46. Wheel 38 in turn rotates viscera removal assembly 50 via flanges 47 and the connecting rods 106 such that assembly 50 rotates in registry and synchronism with the movement of the overhead conveyor chain around the rod 24 and wheel 38.

VISCERA REMOVAL ASSEMBLY

Referring to FIGS. 1–6, the viscera removal assembly 50 includes 25 viscera removal units 54, each unit including a viscera removal member 52. The removal units 54 are each pivotally secured to hub 57 (FIG. 6) which in turn is rotatably mounted at a fixed position along nonrotatable shaft 21. Units 54 are circumferentially spaced equally about shaft 21 and extend radially outwardly therefrom. When so positioned, each of the viscera removal members 52 extends over the top edge 58 of a right, circular, cylindrical housing or drum 56 which extends concentrically around nonrotatable shaft 21 and partially encloses the mechanisms comprising viscera removal units 54. Housing 56 is rotatably mounted about shaft 21 via a spoked wheel 60 similar to conveyor guide wheel 38. Wheel 60 is rotatably mounted at a fixed position along shaft 21 by hub 61.

Each viscera removal member 52 extends over the top edge 58 of housing 56 in vertical alignment with one fowl positioning and clamping assembly 110 including clamping forks 112 extending through the housing in its lower portion (see FIGS. 1, 2, 4, 5 & 6).

Figure 13:
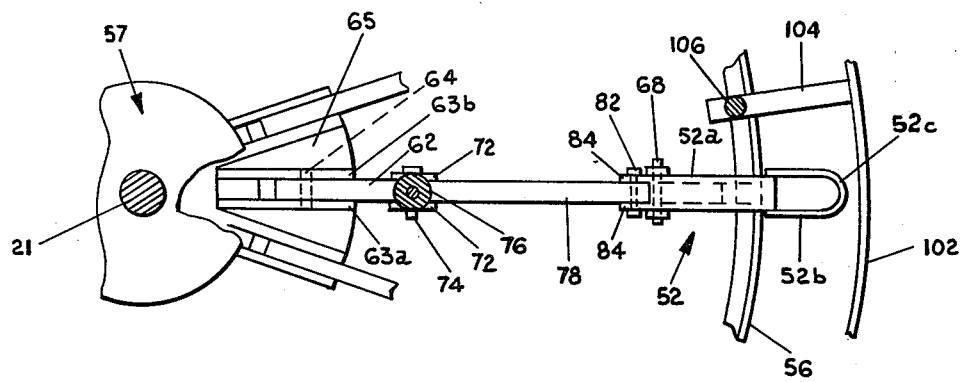
FIG. 13 is a fragmentary plan view of the eviscerating apparatus taken along plane XIII—XIII of FIG. 6.

As is best seen in FIG. 6, each of the viscera removal members 52 is pivotally supported via two pivot axes enabling it to be cammed through a path to remove the viscera from the fowl. Each removal unit 54 includes a generally triangular plate 62 mounted for pivotal movement on suitable bearing means about pivot axis 64 on rotatable hub 57 fixedly secured at one position along shaft 21. As shown in FIG. 13, each plate 62 is pivotally secured between two securing plates 63a and 63b which extend outwardly from hub 57. Twenty-five sets of such securing plates are provided, one for each plate 62. Each set is spaced from the next about the periphery of the hub. The plates 63 provide stability and support for the plate 62 as it is pivoted about the pin or bolt which forms the pivot axis 64. Removal member 52 is pivotally secured on U-shaped bracket 66 about pivot axis 68 adjacent and over the upper edge of plate 62 near its apex end.

Pivotal movement of the removal member 52 about pivot axis 68 is accomplished with an upper camming assembly 70 including an elongated, generally U-shaped link 72 pivotally mounted over the upper edge of plate 62 on suitable bearing means at pivot axis 74. Extending parallel to link 72 from its closed end is a cylindrical roller 76. A second link 78 connects link 72 with a pair of flanges 84 on the rear of the removal member 52 via pins or bolts forming pivot axes 80 and 82.

Pivotal movement of member 52 about pivot axis 68 is caused by the rotational contact of roller 76 with an irregularly configured, upper camming plate 86 secured in a fixed or stationary position with respect to nonrotatable shaft 21 on a hub 88. The area of roller 76 opposite the area thereof contacted by a plate 86 is contacted by a guide rod 90 suspended from a guide support plate 92 which is also secured in a stationary position with respect to shaft 21 by hub 88. Guide rod 90 is spaced from and parallels the contour of the peripheral edge of camming plate 86 a distance approximating the diameter of roller 76. This prevents the upper camming mechanism 70 from falling toward housing 56 and retains roller 76 in contact with the peripheral edge of camming plate 86.

Pivotal movement of plate 62 about pivot axis 64 is controlled by a lower camming assembly 94. Assembly 94 includes a cylindrical camming roller 96 extending generally downwardly such that it contacts the peripheral edge of a lower camming plate 98. Lower camming plate 98 is secured in a fixed or stationary position with respect to central shaft 21 on hub 100.

Figure 10:
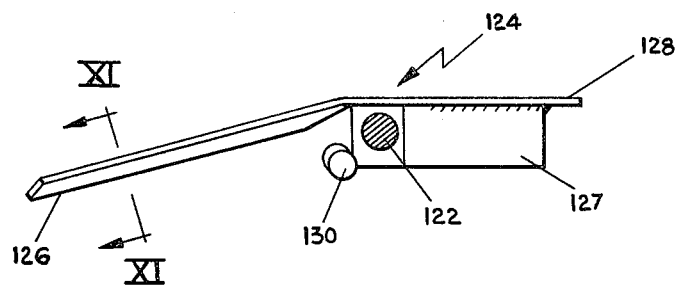
FIG. 10 is a side view of the pivotal member which facilitates opening of the abdominal cut in the fowl taken along plane X—X of FIG. 9.

The actual contours of upper and lower camming plates 86 and 98, respectively, are illustrated in FIG. 10. Camming plates 86 and 98 are fixedly secured in a precise relationship to one another. Position 87 of upper camming plate 86 represents the position on the peripheral edge which is the greatest distance X from the center 101 of shaft 21 of any point on the periphery of plate 86. Conversely, position 99 on lower camming plate 98 corresponds to the smallest distance Y of any point on the periphery of lower camming plate 98 from center 101. Points 87 and 99 of plates 86 and 98, respectively, are positioned in the same vertical plane and cause the removal members to be pivoted to their downwardmost positions, i.e., their position of maximum penetration in the body cavity of the fowl, position A in FIG. 6. Accordingly, when the rollers 76 and 96 are rotated to points 87 and 99 by the rotational motion of the viscera removal assembly 50 when engaged with conveyor 20, the viscera removal member 52 will be pivoted to its lowermost position with its lower end immediately adjacent clamping fork 112 and against the surface of housing 56.

Similarly, the removal member 52 is pivoted about pivot axes 64 and 68 by the contact of rollers 76 and 96 with the remaining portions of the contoured edges of plates 86 and 98 between its raised position (shown in phantom in FIG. 6 at position B) and a plurality of intermediate positions between positions A and B, one of which is represented by the solid lines in FIG. 6 at position C. Accordingly, the removal member will be pivoted about the two pivot axes through a large number of positions between positions A and B such that it follows an arcuate path into the abdomen of a pre-positioned bird. The removal member follows the breastbone of the bird to the bird's spine which is positioned adjacent the outer surface of housing 56. Thereafter, the member 52 is drawn upwardly along the bird's spine and parallel to the surface of housing 56 such that the viscera is drawn out of the body cavity. The viscera is laid over the vent of the bird, preferably on the upstream side, as the shackle is pulled away from the assembly 110 following completion of the eviscerating operation. Member 52 does not completely separate the viscera from the bird. The viscera remains connected but laid out for inspection so that inspectors may look at the viscera and bird carcass associated therewith. Separation of the viscera from the bird carcass takes place in an operation following the evisceration.

As illustrated in FIG. 3, the eviscerating apparatus is normally rotated in a clockwise direction. However, the machine may be easily converted for rotation in the counterclockwise direction by inverting or flipping over the cam plates 86 and 98 in the respective vertical positions. The plates will thus present a mirror image of their contours in their regular positions and cause the members 52 to be moved in a corresponding sequence reversed from the clockwise sequence.

Each of the viscera removal members 52 includes a support member 52a having a generally rounded V-shape when viewed from its side secured to the U-shaped bracket 66 such that the support extends out and over the upper edge 58 of housing 56. Rigidly secured to the lower end of member 52a is the actual removing portion of member 52 including a rigid loop of stainless steel rod or the like bent into a generally convex shape extending away from the housing 56. The convex portion is formed by three continuous, rectilinear bent portions 52b while the closed end of the loop 52c extends in a reverse curvature back away from the housing 56. Accordingly, member 52 acts as a type of spoon for contacting and pulling the viscera of the fowl out of its abdominal cavity.

During insertion, it slides between the viscera and the breastbone passing the end of its downward stroke beneath the viscera. During removal, the viscera is carried upwardly and out of the cavity to the position noted previously. Also, member 52 is somewhat resilient because of the natural resiliency of the steel preferably used in portions 52a and 52b. Such resiliency enables the removal member to accommodate irregularities in bird sized by moving slightly toward and away from housing 56.

Additional features of the viscera removal assembly 50 include a generally right circular cylindrical guide rim 102 concentric with both housing 56 and shaft 21 and secured to housing 56 adjacent its top edge 58. Guide rim 102 provides a guiding surface for shackle 32 as they hang downwardly from conveyor 20 such that each fowl is accurately positioned with respect to a removal member 52. Extending inwardly from the inner surface of rim 102 are five generally horizontal flanges 104 from which connecting rods 106 extend upwardly into engagement with flanges 47 secured to rim 40 of conveyor guide wheel 38 as mentioned above. Rods 106 slidably engage the apertures in flanges 47 and transfer the rotational movement of guide wheel 38 to housing 56 and the remainder of the viscera removal assembly 50 except for upper and lower camming plates 86 and 98 and guide rod support plate 92 which remain stationary.

POSITIONING AND CLAMPING ASSEMBLIES

Referring now to FIGS. 1, 2, and 4–9, the several assemblies 110 for accurately positioning and clamping the individual fowl as they are brought into registry with the apparatus are specifically illustrated. A positioning and clamping assembly 110 is provided in vertical alignment with each of the viscera removal units 54 and viscera removal member 52. The positioning and clamping means include rigid loop projections 114 extending radially outwardly and normal to the outside surface of housing 56 at spaced intervals therearound. Clamping forks 112 extend through pairs of slots 116 provided in housing 56 such that each fork is in general vertical alignment with one of the loop projections and one of the viscera removal members 52.

Figure 11:
FIG. 11 is a sectional view of one portion of the pivotal member taken along plane XI—XI of FIG. 10.

As is best seen from FIGS. 6 and 9, each of the loop projections 114 includes two parallel rods 118 extending outwardly from housing 56. Rods 118 are joined by a generally rounded V-shaped section 120 at the closed end of the loop. Between the two legs of the V-shaped section 120 is secured a pivot rod 122 on which is mounted a plate member 124 (FIGS. 9–11) adapted to have its free end 126 enter the previously made abdominal cut or vent in the fowl positioned with respect to loop 114 in order to initially open that cut. End 126 has a curved cross-sectional shape (FIG. 11) and extends at an angle downwardly from end 128. A V-shaped weight 127 is welded on the bottom of rounded end 128. The plate member is biased by weight 127 to rest generally horizontally with end 126 extending slightly obliquely downwardly and the rounded edge of end 128 overlapping portion 120. When end 126 is contacted by end 52c of viscera removal member 52, plate member 124 is tipped and pivoted about rod 122 facilitating the entry of the removal member into the vent or cut. (See FIGS. 1, 2, 4, and 6.) After the removal member 52 has passed out of the body cavity of the bird the weight of weight 127 and end 128 will return the plate to its original position on projection 114. A cross rod 130 on the bottom of weight 127 provides an additional stop for the plate.

Loop projections 114 extend between the legs of the inverted, vertically suspended fowl such that the plate members 124 are immediately adjacent the abdominal cut in the fowl (see FIGS. 4, 5 and 6). Curved guide rods 132 and 134 (FIGS. 1, 3 and 5) provided for guiding the Y-shaped member 34 of shackle 32 into proper engagement with guide rim 102 while guide rod 136 forces the lower abdomen and leg area of each fowl under the loop projection 114 as the viscera removal means 50 is rotated into registry with the suspended bird (see FIG. 5).

An additional feature of the positioning assembly 110 is the clamping fork 112 which is pivoted into engagement with the shoulder area of each of the birds as the bird is positioned under a loop projection 114 to securely hold the bird against the exterior surface of housing 56 and in abutment with projection 114. As illustrated in FIGS. 6–8, the camming assembly for pivoting each of the forks 112 includes a pair of support rods 140 mounted immediately adjacent the interior surface of housing 56. A support housing 142 is mounted on rods 140, the housing including a pair of tubular sleeves 144 with each sleeve being mounted on one of the support rods 140. Extending downwardly between the sleeves 144 is an elongated bar 146 having a small wheel 148 rotatably mounted at the end thereof. Between the support housing 142 and the inner surface of housing 56 are secured two coaxial tubular sleeves 150 through which a shaft 152 is pivotally mounted on suitable bearing means. Between the two support sleeves 150 is a sleeve 154 which is fixedly secured to shaft 152 and from which extend the two diverging prongs 112a and 112b of clamping fork 112. Sleeve 154 is secured to shaft 152 by suitable securing means such as set screw 156. Secured at one extended end of shaft 152 is a pivot arm 158 including a small wheel 160 secured on the end thereof. Wheel 160 engages a camming block 162 secured adjacent the fork camming mechanism 110 on the inside surface of housing 56. Camming block 162 includes an inclined surface 164 over which wheel 160 rolls to pivot arm 158 and shaft 152 and thus clamping fork 112 toward the position of the viscera removal member 52 positioned vertically thereabove.

Pivotal movement of the fork 112 between its release position (shown in solid in FIG. 6) and its clamping position about the head and shoulders of the vertically suspended fowl (shown in phantom in FIG. 6) is caused by the engagement of wheel 148 with semicircular cam track 166 supported by hub 168 and spokes 170 on vertical shaft 180. Upward movement of support housing 142 along guide rods 140 via wheel 148 and bar 146 causes wheel 160 to roll up the inclined surface of camming block 162 thereby pivoting arm 158, shaft 152, and fork 112 upwardly toward the clamping position. Track 166 includes a vertically movable track section 167 (FIGS. 1 & 2) which is aligned with the positions 87 and 99 on cam plates 86 and 98 to correspond to the position of maximum penetration of the removal members 52. Section 167 is biased with springs or other similar means to move downwardly from the position in the remainder of the track surface. At the point of maximum penetration the members 52 can force the fowl against forks 112 and section 167 will yield somewhat allowing forks 112 to pivot slightly downwardly. After the members 52 are pivoted upwardly, the biasing means force section 167 back to the level of the remainder of track 166 and forks 112 are returned to their original clamping positions. Such resiliency or yielding helps accommodate variations in bird sizes and prevents damage to the bird carcass.

Accordingly, as illustrated in FIGS. 1, 2, and 5, engagement of wheels 148 with cam track 166 as the removal assembly 50 is rotated causes forks 112 to be pivoted upwardly into the clamping position. The clamping position is held throughout the semicircular path of travel of the bird about the viscera removal means 50. However, section 167 provides some yielding at the point of maximum penetration of members 52 allowing slight downward pivoting of forks 112 at that position to accommodate various bird sizes. After removal of the viscera, the fork is released allowing the bird to be transported by the conveyor to other processing operations.

DISENGAGING DRIVE APPARATUS

As illustrated in FIGS. 1, 2 and 6, assembly 50 includes apparatus for disengaging assembly 50 from the conveyor guide wheel 38. The disengaging apparatus includes a screw jack 172 operated by hand crank 174 and connecting rod 176 (FIGS. 1 and 2) for axially vertically moving the entire nonrotatable, central shaft 21 with respect to the framework 12. Hubs 56, 61, 88, and 100 are all secured in fixed positions along shaft 21 and therefore are moved in unison with the shaft. However, hub 44 of conveyor guide wheel 38 as well as the securing means for shaft 21 on frame members 13 and 16 are slightly larger than the shaft and allow the shaft to slide axially therethrough when moved by screw jack 172. It will be understood that movement of the screw jack to drop the shaft and its associated components downwardly causes the connecting rod 106 to slide downwardly out of engagement with flanges 47 thereby preventing rotational movement of the removal means 50. Repair and adjustment of assembly 50 can therefore be effected while conveyor 20 continues to operate. The vertical movement of assembly 50 also allows the assembly to be adjusted for different sizes of birds suspended from conveyor 20 since rods 106 slide to various vertical positions with respect to flange 47 without becoming disengaged therefrom.

Once the vertical position of the viscera removal assembly 50 has been changed with screw jack 172, the position of the cam track 166 which guides the pivotal movement of clamping fork 112 must be adjusted correspondingly. Such adjustment is accomplished with a screw jack 178 which move shaft 180 axially vertically to change the position of the upper surface of the cam track 166 thereby changing the amount of pivotal movement of the clamping fork 112. Screw jack 178 is operated by hand crank 182 (FIGS. 1 and 2) via a connecting rod 184. Accordingly, the degree to which the clamping fork pivots upwardly toward the loop projections 114 and thus the amount of space left between the fork and the outer surface of the housing 56 is governed by the vertical position of the cam track 166. This adjustment feature not only allows adjustment for vertical positioning of the viscera removal assembly 50 but allows the present invention to accommodate larger and smaller birds and fowl.

SUMMARY OF OPERATION

As will now be apparent, bird or fowl carcasses which have already been picked and cleaned are moved along conveyor 20 suspended from shackles 32 by their legs in an inverted manner. A generally horizontal cut or vent is made in the lower portion of the abdomen between the legs of each bird. Curved guide rods 132 and 134 direct the suspended birds and shackles behind the guide rod 136 which forces the birds into proper position and registry with one of the 25 positioning and clamping assemblies 110.

Each assembly 110 is in vertical alignment with one of the viscera removal members 52 included in one of the 25 viscera removal units 54. (See FIG. 5.). Approximately at position M (FIG. 3) guide rod 136 forces each bird under one of the loop projections 114 extending outwardly from housing 56 such that plate 124 is immediately adjacent the abdominal cut previously made in the bird. The head and shoulders of the bird project through the vertically aligned clamping fork 112. Since the connecting rods 106 are engaged with flanges 47 on conveyor guide wheel 38, the entire viscera removal assembly is rotated in synchronism and registry with the conveyor 20. As the rotation continues, clamping fork 112 is pivoted upwardly, clamping the shoulder area of the bird against the outer surface of housing 56 by means of engagement of wheel 148 with cam track 166 and the upward movement of support housing 142. (See FIG. 6.) After such clamping, the bird remains positioned for viscera removal throughout its semicircular path of travel in registry with the viscera removal assembly (between positions M and N in FIG. 3).

Simultaneously with the positioning of each bird or fowl, camming plates 86 and 98 are causing pivotal movement of viscera removal member 52 around pivot axes 64 and 68 from a position such as that shown at B in FIG. 6 toward the position C shown therein. As member 52 reaches position C, end 52c of member 52 engages plate 124 and forces end 126 of the plate into the previously made abdominal cut in the bird to open that cut for removal of the viscera. The peripheral contours of camming plate 86 and 98 cause the continued downward movement of removal member 52 through the parallel rods 118 of loop member 114 into the abdominal cavity of the bird in an arcuate path. The arcuate movement and curved configuration of viscera removal members 52 causes the viscera of the bird to be loosened and drawn with the movement of the member 52. When rotation of the apparatus has reached the locations of points 87 and 99 on the camming plates 86 and 98, removal member 52 reaches position A, its downwardmost position which is adjacent the lung and heart area of the bird. Track section 167 may allow forks 112 to yield downwardly somewhat at this point. Thereafter, the configuration of the camming plates changes causing the removal member to be pivoted upwardly along the external surface of housing 56 thereby drawing the loosened viscera out of the abdominal cavity. The ends 52c of members 52 follow a linear path on their upward stroke out of the bird along housing 56.

At the end of the semicircular path of travel, at position N (FIG. 3), the removal member 52 has been withdrawn from the abdominal cavity. At this point, a guide rod 186 (FIGS. 2) causes the eviscerated fowl to follow the path of the conveyor, while the portion of the eviscerating apparatus with which the bird has been in contact continues to rotate through the circular path of travel of the apparatus away from the bird. The removed viscera are released as the viscera removal members 52 are pivoted away from the exterior surface of housing 56 (after position N) and the viscera is laid over the bird carcass. Plate 188 (FIG. 2) helps separate the birds and viscera from the machine. The conveyor 20 transports the bird with removed viscera for inspection, cleaning, sorting, separation and/or disposal. The entire series of movements of viscera removal members 52 as guided by camming plates 86 and 98 is best illustrated in FIGS. 1, 2, and 6.

After the bird or fowl carcasses are separated from the viscera removal assembly 50, housing 56 is rotated through the remainder of its circular path of travel, i.e., the rear semicircle, where washing and sanitizing apparatus are typically positioned to clean, wash, and sterilize both the viscera removal members 52 as well as the loop projections 114, clamping forks 112, and the exposed side surfaces of housing 56 before those elements engage another bird at position M. Accordingly, the apparatus is completely cleaned during every revolution in accordance with existing health standards.

Should a breakdown occur or some adjustment be needed in the viscera removal assembly 50, screw jack 172 is rotated with hand crank 174 to move the entire non-rotated central shaft 21 and all of the apparatus of the viscera removal assembly secured therealong downwardly such that connecting rods 106 slide out of engagement with the conveyor guide wheel 38. Accordingly, rotation of the viscera removal assembly 50 is halted for repair and adjustment while the conveyor 20 continues to operate and move the suspended birds around the path of travel illustrated in FIG. 3. During such periods, evisceration may be accomplished manually by human operators until the repair and adjustment of the automated eviscerating apparatus 10 is completed. Any vertical movement of the viscera removal assembly 50 may be compensated for in the clamping fork camming apparatus 110 via screw jack 178, hand crank 182, and rod 184 as mentioned above. It may be desirable, additionally, to adjust camming apparatus 110 independent from assembly 50 depending on the physical characteristics of the fowl.

Accordingly, the present invention provides a simple yet reliable and highly efficient eviscerating apparatus which continuously eviscerates birds and fowl as part of a larger poultry processing operation. Should breakdown occur, the eviscerating apparatus may be temporarily stopped while the conveyor from which it draws its power may continue to operate thereby preventing shutdown of the entire processing operation during repair or adjustment of the eviscerating apparatus.

While one form of the invention has been shown and described, other forms will now be apparent to those skilled in the art. Therefore, it will be understood that the embodiments shown in the drawings and described above are merely for illustrative purposes and are not intended to limit the scope of the invention which is defined by the claims which follow.

The embodiments of the invention in which an exclusive property or privilege is claimed are defined as follows:

1. Eviscerating apparatus for poultry, fowl, and the like, said fowl typically having a visceral body cavity with a compound curvature, comprising conveyor means for conveying at least one fowl through a predetermined path; a support; holding means spaced from said support for holding the fowl in a predetermined position substantially fixed with respect to at least a portion of said conveying means during such conveyance; a viscera removal member moveable with said fowl; and means on said support for supporting and moving said viscera removal member through a cut in the vent of the fowl for removing the viscera during conveyance of the fowl, said supporting and moving means including pivot support means on said support movable in registry with said holding means along said predetermined path and providing at least a pair of spaced pivot axes for pivotally supporting said viscera removal member for movement in a path having a compound curvature with respect to said holding means, said pivot axes being spaced at different distances from said support on one side of said holding means, and actuating means for pivoting said viscera removal member about said two pivot axes whereby said viscera removal member follows a generally compound, arcuate path into the body cavity of the fowl, around the viscera thereof and thereafter withdraws said viscera through the abdominal cut.

2. The apparatus of claim 1 including means for rotating said removal member and said supporting and moving means into alignment with the fowl on said conveyor means.

3. The apparatus of claim 2 wherein said means for rotating said supporting and moving means include connecting means for engaging said conveyor means such that said removal member and said supporting and moving means travel in registry with the fowl on said conveyor means; means for selectively engaging and disengaging said connecting means with said conveyor means.

4. The apparatus of claim 2 wherein said support includes a central, vertically extending, non-rotatable shaft; said conveyor means includes a pulley rotatably mounted on said shaft and an elongated, flexible conveyor drive means extending at least partially around said pulley for rotating said pulley; said supporting and moving means being rotatably mounted on said shaft below said pulley and including a right, circular, cylindrical housing having inside and outside surfaces and top and bottom edges, means for supporting said housing concentrically about said shaft, said actuating means including first pivot means mounted on said shaft for pivoting said removal member about one of said two pivot axes and a second pivot means mounted on said first pivot means for pivoting said removal member about the second of said two pivot axes; said holding means for holding said fowl being mounted on said supporting and moving means and including a clamping member extending through said housing; said means for rotating said removal member and said supporting and moving means including connecting means extending above said housing for engaging said pulley and means mounted below said housing for raising and lowering said supporting and moving means for engaging and disengaging said connecting means with said pulley.

5. The apparatus of claim 1 wherein said actuating means includes first and second pivot means for pivoting said removal member respectively about said two pivot axes; first and second camming means respectively associated with said respective pivot means for moving said first and second pivot means.

6. The apparatus of claim 1 wherein said fowl holding means include a backing member and means for clamping the fowl against said backing member along a predetermined portion of said path.

7. The apparatus of claim 6 wherein said clamping means includes a clamping fork, first camming means for raising and lowering said fork, and second camming means for pivoting said fork toward and away from said backing member during said raising and lowering.

8. The apparatus of claim 7 wherein said clamping means including a pair of parallel rods mounted on said backing member, a support slidably mounted on said rods, a housing mounted on said support, said fork including an axle providing a pivot axis pivotally mounted in said housing; said first camming means includes a first cam supported below said backing member and a first cam follower secured to and projecting below said support; said second camming means including a second cam mounted on said backing member adjacent said rods and support and a second cam follower secured to said axle whereby movement of said first cam follower along said first cam moves said second cam follower along said second cam.

9. The apparatus of claim 7 wherein said first camming means includes a cam track and means for moving said cam track for adjusting the clamping position of said clamping fork.

10. Eviscerating apparatus for poultry, fowl, and the like comprising conveyor means for continuously conveying fowl along a path, said conveyor means including means for suspending the fowl in an inverted manner; a floor-mounted support positioned along said path and adjacent said means for suspending said fowl and means on said support for removing viscera from the fowl, said removing means including a series of viscera removal members and means for engaging said viscera removal members with said fowl, said engaging means including pivot support means movable in registry with said means for suspending said fowl during conveyance and providing a pair of spaced pivot axes for each of said removal members for pivotally supporting each of said removal members with respect to said means for suspending the fowl; means for moving at least a portion of said viscera removal means including said pivot support means in registry with the fowl suspended from said conveyor means, said pivot axes supported from said support, spaced at different distances from said support, and both being located exterior of the fowl to be eviscerated; and actuating means for pivoting each of said viscera removing members about said two pivot axes such that said members follow a generally arcuate path having a compound curvature into the body and cavity of the fowl and around the viscera thereof and thereafter withdraw said viscera from said cavity.

11. The apparatus of claim 10 wherein said viscera removal means include means for clamping the suspended fowl in a predetermined position with respect to said viscera removal members.

12. The apparatus of claim 11 wherein said support includes a central, vertical stationary shaft; said clamping means including a right, circular, cylindrical housing having top and bottom edges and inside and outside surfaces and partially enclosing said viscera removal means, a wheel for rotationally supporting said housing concentrically with said shaft, fork means for clamping the fowl against the outside surface of said housing and means for pivoting said fork means toward and away from said housing, said means for pivoting said fork means including camming means for causing said pivoting of said fork means; said viscera removing member extending over said housing top edge in general vertical alignment with said fork means.

13. The apparatus of claim 12 wherein said camming means include a contoured cam track generally below said housing having means for camming said fork pivoting means to cause said fork means to pivot toward said housing while said viscera removing member is being pivoted about said two pivot axes to remove the viscera.

14. The apparatus of claim 12 wherein said housing includes a fowl positioning means extending normal to said outside surface of said housing in general vertical alignment with said fork means, said positioning means including means for opening an abdominal cut in the fowl as said viscera removal member enters the fowl.

15. The apparatus of claim 14 wherein said positioning means includes a rod formed into a loop with its closed end projecting radially outwardly from said housing; said abdominal cut opening means including a plate member pivotally mounted at said closed end of said loop; said viscera removing member adapted to force said plate member into the abdominal cut as said removing member enters the fowl.

16. The apparatus of claim 10 wherein said support includes a central, vertical, stationary shaft; said means for pivoting said viscera removal means include a multiple pivot assembly having generally planar plate member mounted vertically for pivoting about a first horizontal axis on a hub rotatably mounted along said shaft, said viscera removing member being pivotally mounted on said plate member for pivotal movement about a second horizontal axis on said plate member and spaced from said shaft and said first axis; said multiple pivot assembly also including first and second pivot links, said first link mounted on said plate member for pivotal movement on said plate member about a third horizontal axis, said second link pivotally secured between said viscera removing member and said first link; first camming means for pivoting said first and second links to pivot said viscera removing member about and second axis; said second camming means for pivoting said plate member about said first axis.

17. The apparatus of claim 16 wherein said first link is elongated and has a longitudinal axis; said first camming means including an elongated cylindrical roller mounted on said first link with its axis parallel to said longitudinal axis of said first link; a first contoured cam plate secured transversely of said shaft on a non-rotatable hub mounted in a fixed position about and along said shaft, the peripheral edge of said cam plate engaging said roller on said first link, and a retaining member extending around, parallel to, and spaced from said cam plate edge for limiting movement of said roller on said first link away from said cam plate edge.

18. The apparatus of claim 17 wherein said second camming means includes an elongated, cylindrical roller extending downwardly from the bottom edge of said plate member; a second contoured cam plate secured transversely of said shaft on a non-rotatable hub mounted in a fixed position about and along said shaft, the peripheral edge of said cam plate engaging said roller of said second camming means.

19. The apparatus of claim 16 wherein said second camming means includes an elongated, cylindrical roller extending downwardly from the bottom edge of said plate member; a second contoured cam plate secured transversely of said shaft on a non-rotatable hub mounted in a fixed position about and along said shaft, the peripheral edge of said cam plate engaging said roller of said second camming means.

20. The apparatus of claim 16 wherein said means for moving said viscera removal means in registry with the fowl suspended from said conveyor include means for axially moving said shaft with said multiple pivot assembly and said first and second camming means secured thereto toward and away from said conveyor means and connecting means for engaging said conveyor means to move said multiple pivot assembly in registry with the fowl suspended from said conveyor means.

21. The apparatus of claim 16 wherein said viscera removal means include means for clamping the suspended fowl in a predetermined position with respect to said viscera removing means.

22. The apparatus of claim 21 wherein said clamping means includes a right, circular, cylindrical housing having top and bottom edges and inside and outside surfaces and surrounding said multiple pivot assembly, a wheel for rotationally supporting said housing concentrically with said shaft, fork means extending through said housing for clamping the fowl against the outside surface of said housing and means for pivoting said fork means toward and away from said housing; said means for pivoting said fork means including camming means for causing said pivoting of said fork means; said viscera removing member extending over said housing top edge in general vertical alignment with said fork means.

23. The apparatus of claim 10 wherein said viscera removing member includes a rod bent into a rigid loop having a closed end adapted for insertion in the fowl through the abdominal cut; the major portion of said loop being formed in a convex shape curving outwardly toward the suspended fowl; said closed end of said loop comprising a reverse curvature turning outwardly from the lower end of said major portion toward the fowl.

24. Eviscerating apparatus for poultry, fowl, and the like comprising a supporting framework; a vertical shaft, a continuous, circular, cylindrical drum mounted concentrically and rotatably about said shaft; overhead conveying means supported above said drum in general vertical alignment with at least a portion of the periphery thereof, said conveying means including means for suspending a plurality of fowl adjacent the side surface of said drum; means for rotating said drum for synchronous movement of said drum and conveying means; a plurality of pivotal clamping means spaced circumferentially about said drum for clamping said fowl against said drum; a plurality of viscera removal means extending radially outwardly from said shaft and over the top edge of said drum for removing the viscera from said suspended fowl, each removal means including a removal member in general vertical alignment with one of said clamping means and pivot means including spaced, multiple pivot axes for supporting said removal member with respect to one of said clamping means and means for pivoting said removal member in a generally arcuate path into the body cavity of said fowl and around the viscera thereof and thereafter out of said cavity to withdraw the viscera therefrom.

25. The apparatus of claim 24 wherein said rotating means comprises means for connecting said drum and said overhead conveyor means and which further comprises means for moving said connecting means into and out of engagement with said overhead conveying means for selectively rotating said drum, viscera removal means and clamping means in registry with said conveying means.

26. Eviscerating apparatus for poultry, fowl, and the like comprising overhead conveyor means for supporting and conveying a plurality of fowl suspended therefrom; viscera removal means for removing the viscera of each of the suspended fowl including at least one viscera removal member and actuating means for moving said member to remove viscera from the fowl; cylindrical housing means for engaging and positioning the fowl with respect to said viscera removal means, said housing means providing a surface against which the fowl is positioned and separating and shielding the positioned fowl from said actuating means; clamping means for clamping the fowl against said housing means; and interconnecting means for selectively connecting said housing means with said overhead conveyor for moving said removal means, housing means, and clamping means in synchronism with said overhead conveyor means; and means for moving said interconnecting means to engage and disengage said interconnecting means with overhead conveyor.

27. Eviscerating apparatus for poultry, fowl, and the like comprising overhead conveyor means for supporting and conveying a plurality of fowl suspended therefrom; viscera removal means for removing the viscera of each of the suspended fowl including at least one viscera removal member and actuating means for moving said member to remove viscera from the fowl; cylindrical housing means for engaging and positioning the fowl with respect to said viscera removal means, said housing means providing a surface against which the fowl is positioned and separating and shielding the positioned fowl from said actuating means; clamping means for clamping the fowl against said housing means; and interconnecting means for selectively connecting said housing means with said overhead conveyor for moving said removal means, housing means, and clamping means in synchronism with said overhead conveyor means; said cylindrical housing means including a right, circular cylindrical drum extending around said viscera removal means; said removal means including means for pivoting said viscera removal member over the top edge of said drum; said clamping means extending through aperture means in said drum in alignment with said removal member.

28. The apparatus of claim 26 wherein said viscera removal member is adapted to enter the abdominal cavity of the fowl suspended from said conveyor means, said removal means including means for pivoting said removal member about at least two spaced pivot axes such that said member follows a generally arcuate path into the abdominal cavity of the fowl and around the viscera thereof and thereafter withdraws said viscera.

29. Eviscerating apparatus for poultry, fowl and the like comprising conveyor means for supporting and conveying a plurality of fowl to be eviscerated; viscera removal means for removing the viscera from the fowl being conveyed; connecting means for connecting said removal means to said conveyor means to cause said removal means to move in registry and synchronism with said conveyor means; and means for disengaging said connecting means from said conveyor means for allowing said conveyor means to continue to operate while said removal means is stopped and disengaged therefrom.

30. The apparatus of claim 29 wherein said conveyor means includes an overhead conveyor having a portion of its length tracing a constant-radius arc; said removal means including a removal assembly extending radially outwardly from a central vertical shaft extending along an axis passing through the center of said arc; and circular positioning means for engaging and positioning the fowl with respect to said removal assembly; said connecting means including a plurality of vertically extending rods projecting upwardly from said circular positioning means into engagement with said conveyor means whereby said circular positioning means and removal assembly are rotated by said conveyor following said semi-circular path.

31. The apparatus of claim 30 wherein said means for disengaging said connecting means from said conveyor means include means for lowering said central shaft, said removal assembly and said circular positioning means whereby said rods slide out of engagement with said overhead conveyor.

32. Apparatus for eviscerating the body cavity of a fowl suspended from and conveyed by an overhead conveyor, said apparatus including means for positioning the fowl, said positioning means moving in synchronism with said conveyor; means for eviscerating the fowl while it is positioned by said positioning means, said eviscerating means moving in synchronism with said conveyor and positioning means and comprising:
  a floor-mounted support positioned along and adjacent to the path of conveyance of the fowl suspended from the overhead conveyor, a pivotable support member pivotally mounted on said support about a first axis, and means for pivoting said support member with respect to said support about said first axis in accordance with a predetermined program;
  a spoon-like eviscerating member adapted for entry into and withdrawal from the body cavity of the fowl, said eviscerating member being pivotably attached to said pivotable support member for movement about a second axis, said first and second axes both being located exterior of the fowl body cavity to be eviscerated by said spoon-like eviscerating member; and
  means for pivoting said spoon-like eviscerating member with respect to said pivotable support member in accordance with a predetermined program, said programs causing said eviscerating member to follow a predetermined path of entry into and withdrawal from the body cavity of the fowl.

33. The apparatus as set forth in claim 32 wherein said positioning means comprises a surface against which said fowl is placed; a first member protruding from said surface adapted to nest between the legs of said fowl; and means for clamping said fowl in abutment with said surface and said first member.

34. The apparatus as set forth in claim 33 wherein said positioning means and eviscerating means rotate about a central shaft comprising said support and wherein said pivoting means comprise two cams affixed to said shaft, a first cam follower affixed to said support member and engaging one of said cams and a second cam follower pivotably affixed to said eviscerating member, said second cam follower engaging the other of said cams.

35. The apparatus as set forth in claim 34 wherein said second cam follower is also pivotably connected to said support member.

* * * * *